US012205775B2

(12) United States Patent
Shi et al.

(10) Patent No.: US 12,205,775 B2
(45) Date of Patent: Jan. 21, 2025

(54) PROCESS TO IMPROVE COVERAGE AND ELECTRICAL PERFORMANCE OF SOLID ELECTROLYTIC CAPACITORS

(71) Applicant: KEMET Electronics Corporation, Fort Lauderdale, FL (US)

(72) Inventors: Yaru Shi, Simpsonville, SC (US); Antony P. Chacko, Simpsonville, SC (US); Ajaykumar Bunha, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 335 days.

(21) Appl. No.: 17/708,196

(22) Filed: Mar. 30, 2022

(65) Prior Publication Data

US 2022/0223351 A1 Jul. 14, 2022

Related U.S. Application Data

(63) Continuation-in-part of application No. 16/429,936, filed on Jun. 3, 2019, now Pat. No. 11,393,637.

(60) Provisional application No. 63/173,761, filed on Apr. 12, 2021.

(51) Int. Cl.
*H01G 9/15* (2006.01)
*H01G 9/00* (2006.01)
*H01G 9/028* (2006.01)
*H01G 9/048* (2006.01)
*H01G 9/04* (2006.01)

(52) U.S. Cl.
CPC ............ *H01G 9/15* (2013.01); *H01G 9/0032* (2013.01); *H01G 9/028* (2013.01); *H01G 9/048* (2013.01); *H01G 2009/05* (2013.01)

(58) Field of Classification Search
None
See application file for complete search history.

(56) References Cited

U.S. PATENT DOCUMENTS

| | | | |
|---|---|---|---|
| 6,315,918 B1 * | 11/2001 | Mita | H01G 11/60 252/62.2 |
| 7,411,779 B2 | 8/2008 | Merker et al. | |
| 7,658,986 B2 | 2/2010 | Poltorak et al. | |
| 8,771,381 B2 | 7/2014 | Chen et al. | |
| 8,808,403 B2 | 8/2014 | Qiu et al. | |
| 8,882,856 B2 | 11/2014 | Intelmann et al. | |
| 9,236,191 B2 | 1/2016 | Chacko et al. | |
| 9,524,829 B2 | 12/2016 | Zhang et al. | |
| 10,109,428 B2 * | 10/2018 | Shi | H01G 9/07 |
| 10,147,551 B2 | 12/2018 | Intelmann et al. | |
| 10,943,742 B2 * | 3/2021 | Bunha | H01G 9/15 |
| 2014/0340819 A1 * | 11/2014 | Zhang | H01G 9/028 361/523 |
| 2017/0236647 A1 | 8/2017 | Intelmann et al. | |
| 2019/0311857 A1 * | 10/2019 | Bunha | C09D 4/06 |
| 2022/0223351 A1 * | 7/2022 | Shi | H01G 9/048 |

FOREIGN PATENT DOCUMENTS

| | | |
|---|---|---|
| EP | A 1524678 | 4/2005 |
| EP | A 1746613 | 1/2007 |

OTHER PUBLICATIONS

American Chemical Society; Unexpected Interaction Between PEDOT and Phosphonium Ionic Liquids; Vanessa Armel et al; published Jul. 8, 2013.
ISA/US; International Search Report and Written Opinion prepared for PCT/US2022/022469; Date mailed: Jun. 28, 2022.

* cited by examiner

*Primary Examiner* — Dion R. Ferguson
(74) *Attorney, Agent, or Firm* — Joseph T. Guy; Patent Filing Specialist Inc.

(57) ABSTRACT

Provided herein is a method for forming a capacitor and an improved capacitor formed by the method. The method comprises providing an anode with an anode lead extending therefrom. A dielectric is formed on the anode thereby forming an anodized anode. A cathode layer is formed over the dielectric wherein the cathode layer is formed by applying a conductive polymer solution or dispersion and applying a primer solution or dispersion comprising a monophosphonium or monosulfonium cation.

38 Claims, No Drawings

PROCESS TO IMPROVE COVERAGE AND ELECTRICAL PERFORMANCE OF SOLID ELECTROLYTIC CAPACITORS

CROSS-REFERENCE TO RELATED APPLICATIONS

This application is a continuation-in-part of pending U.S. patent application Ser. No. 16/429,936 filed Jun. 3, 2019 which is incorporated herein by reference. This application also claims priority to U.S. Provisional Application No. 63/173,761 filed Apr. 12, 2021 which is incorporated herein by reference.

BACKGROUND

Solid electrolytic capacitors with conductive polymers as the cathode are widely used in the electronics industry because of their low equivalent series resistance (ESR) and "non-burning" healing mechanism. Typical methods for applying conductive polymers onto a dielectric include in situ chemical/electrochemical oxidation polymerization and coating of preformed conductive polymer dispersions or solutions. Compared with an in-situ polymerization method, coating of preformed conductive polymer is much simpler and less costly.

One particular concern with the conductive polymer coating process is how to form a defect free polymer coating. As described in U.S. Pat. No. 7,658,986, a continuous coating of all dielectric surfaces by primary cathode materials is essential to prevent short circuit electrical failure. However, as with any coating process, surface tension of the conductive polymer dispersion could cause it to retreat from edges and corners during the drying process resulting in insufficient coverage in these areas. Corners and edges are most susceptible to mechanical or thermal mechanical stress during the capacitor manufacturing process. Without a sufficient polymer layer on the corners and edges the dielectric in these areas may be damaged and subsequent layers, such as carbon and metal layers, can come into direct contact with the dielectric leading to increased residual currents and other reliability issues.

One approach disclosed by EP-A-1524678, EP-A-1746613 and U.S. Pat. No. 7,411,779, each of which is incorporated herein by reference, is to mix solid particles with the conductive polymer dispersion. The additional solid particles can be conductive or nonconductive. However, this approach is not always reliable and reproducible. The addition of solid particles often makes the polymeric coating layer brittle, and increases residual leakage and ESR.

Another approach disclosed by U.S. Pat. No. 10,943,742, which is incorporated herein by reference, is to use conductive polymer dispersion containing bimodal particle distribution (1-10 microns and 1-600 nm) to improve coverage. The method involves extra processing step to achieve the bimodal distribution.

U.S. Pat. No. 8,771,381, which is incorporated herein by reference, teaches the application of polyol prior to or in between conductive polymer dispersion layers that only modestly improves polymer corner and edge coverage.

A more effective approach for polymer corner and edge coverage is described in WO201089777 and U.S. Pat. No. 8,882,856, both of which are incorporated herein by reference, which teach the use of an ionic crosslinker solution applied between conductive polymer dispersion dipping cycles to improve polymer coverage of the corners and edges. The effectiveness of the crosslinker is attributed to the presence of multiple cationic functional groups that form a chemical bond, referred to as "crosslinks", between polymer dispersion particles. While crosslinking does improve coverage on the anode, the crosslinker solution may contaminate the conductive polymer dispersion which causes a viscosity increase or even agglomeration of the conductive polymer dispersion.

The formed capacitor's initial electrical performance is good with the polyvalent crosslinkers described above. However, U.S. Pat. Nos. 8,808,403 and 9,524,829, both of which are incorporated herein by reference, state that the performance deteriorates over time especially, under humid conditions. The reason is that these crosslinkers are often ionic materials that contain low molecular weight strong ionic species such as sulfate or p-toluenesulfonate. These strong ionic species can dissociate completely in the presence of water and can diffuse through various cathode layers under high humid conditions. The result is higher leakage current or even electrical short failures. The migration of strong ionic species could also cause serious corrosion on certain metals, particularly aluminum. U.S. Pat. No. 8,808,403, which is incorporated herein by reference, suggests the use of a water wash step after the conductive polymer layer is dried to remove the ionic species from the cured conductivity layer. This approach suffers from other tradeoffs such as delamination of polymer from the dielectric, increased ESR and poor ESR stability. An additional washing step also requires a capital investment and is a detriment to efficient manufacturing efficiency.

U.S. Pat. No. 9,524,829, which is incorporated herein by reference, describes the use of diamine, triamine or polyamine in combination with weak acids, such as acids with a dissociation constant or pKa 0.25-6, as a crosslinker. This combination alleviates the corrosion on aluminum anodes, however, as along as a "crosslinker" is involved in the process, the contamination and viscosity increase of the conductive polymer dispersion or solution is still a problem.

U.S. Pat. No. 9,236,191, U.S. Publ. Pat. Appl. No. 2017/0236647, U.S. Pat. Nos. 10,147,551 and 10,109,428, each of which is incorporated herein by reference, describe monoamine type "primer" or coverage enhancers including amino acids, amine halides, amine sulfonic acid salts, amine carboxylic acid salts, etc. These references all claim only "monomeric" type of primer, i.e. only one amine functionality, instead of two as in the case of crosslinking primer. This approach avoids the viscosity increase or agglomeration problem associated with polyvalent ionic crosslinkers, however, the edge and corner coverage enhancement using monomeric amino primers is inferior. Another drawback associated with amine type primers is poor stability under high temperature application.

In spite of the ongoing effort those of skill in the art still do not have a suitable option for the formation of polymer layers from a preformed dispersion which provides adequate coverage of the edge and corners and which is suitable for high humidity, high temperature conditions. So a need still exists for materials and methods that improve corner and edge coverage of an anode without the negative effect on the leakage performance of the capacitor when exposed to humidity or high temperature.

DESCRIPTION

It has been found that improvements in the edge and corner coverage can be met by applying a solution or dispersion comprising monophosphonium and counter acids in the cathode layer of capacitors. This monophosphonium-counter acid combination exhibits better polymer corner and edge coverage than monoamine type coverage enhancing agents.

Any counter acids that balance the charge of monophosphonium cation are suitable for demonstration of the invention. Particularly suitable counter acids for demonstration of the invention are phosphoric acid, phytic acid, phosphonic acids, sulfuric acid, sulfonic acids, polystyrene sulfonic acid homopolymer or copolymers. Monophosphonium-weak acid combination is preferred due to better performance in high humidity conditions. The monophosphonium-counter acid combination is preferably applied as a solution or dispersion. It may also include other additives to increase the solubility of the monophosphonium-counter acid combination in solution. Preferred solvents are water or other polar solvents such as alcohols. Mixture of water and polar solvents are also appropriate. Monophosphonium-poly weak acid combination is even more preferred because migration of acid counterions under humidity is slower with bulkier acid carrying multiple acid groups.

The ratios of monophophonium and counter acid can vary. It is preferred that monophophonium and counter acid ratios are adjusted so pH of the monophosphonium-counter acid solution is between pH 1-10, more preferably pH 2-7.

The concentration of the monophosphonium-counter acid in the solution or dispersion is not limited but it is preferred to be at least 0.001 molar to achieve the benefit of coverage enhancement.

Many phosphonium salts are considered ionic liquids wherein phosphonium ionic liquids were applied without the presence of solid electrolyes such as PEDOT conductive polymer. U.S. Pat. No. 9,793,058, which is incorporated herein by reference, disclosed use of polymeric ionic liquids containing phosphonium functionalities as a work function modifier. However, polymeric ionic liquids have the drawback of agglomerating conductive polymer dispersion for intended application. U.S. Publ. Pat. Appl. No. 2020/0388441, which is incorporated herein by reference, disclosed the application of ionic liquids in hermetically sealed capacitors to reduce leakage. Polymer edge and corner coverage information is disclosed but according to the examples, crosslinker (diamine salts) is still required to improve coverage even after imidazolium ionic liquids is applied.

In this invention, the phosphonium-counter acid combination alone is adequate for polymer coverage. The more preferred way of usage is to apply a coating of monophosphonium-counter acid solution or dispersion prior to or in between conductive polymeric coatings. It is hypothesized that the hydrophilic and ionic interaction between the monophosphonium-counter acid combination and the conductive polymer particles slows down retreating of the polymer dispersion frontier from the edges and corners during the polymer drying step. Another method is to apply the monophosphonium-counter acid combination as an additive in the conductive polymer dispersion. Yet another method is to use monophosphonium hydroxide as an additive in the conductive polymer dispersion since the extra counter acids in typical conductive polymer dispersion can neutralize monophosphonium hydroxide.

The conductive polymer in this invention can be any type of conductive polymer including polythiophene, polyaniline, polypyrrole or other typical conductive polymers. The conductive polymer can be self-doped or foreign doped. Foreign dopants of conductive polymers can be monomeric or polymeric dopants. More preferred are polymeric dopants including polystyrene sulfonic acid homopolymer and copolymers, as disclosed in U.S. Pat. No. 10,340,091, which is incorporated herein by reference. The conductive polymer in this invention can be a solution as in many cases of self-doped conductive polymers or it can be a dispersion in water or other solvents. When the conductive polymer is a dispersion, it can have various distribution of particle sizes, including mono-, bi-, or even tri-model distribution. One example of bimodel particle size distribution is disclosed in prior art U.S. Pat. No. 10,943,742, which is incorporated herein by reference. The conductive polymer dispersion is this invention may contain additives such as conductivity enhancing agents, crosslinkers or binders. More preferred crosslinkers are crosslinkers containing silane, epoxy or vinylsulfone functional groups.

After the final conductive polymer coating is applied the so coated element may be subjected to further processing steps such as water wash, solvent treatment, or humidity treatment as described in U.S. Pat. No. 9,524,829, which is incorporated herein by reference, before carbon and silver coating.

Monophosphonium-counter acid combination may be made by dissolving commercial monophosphonium compounds and optional counter acids in suitable solvents. Examples of commercial monophosphonium compounds include tetrabutylphosphonium hydroxide, tetrabutylphosphonium halides, tetrabutylphosphonium sulfate, tetrabutylphosphonium bisulfate, bis[tetrakis(hydroxymethyl)phosphonium] sulfate, tributyl(methyl)phosphonium tosylate, tributyl(ethyl)phosphonium diethyl phosphate, tributyl(methyl)phosphonium dimethyl phosphate, tetrabutylphosphonium hexafluorophosphate, tetrabutylphosphonium hexafluorophosphate, tetraphenylphosphonium chloride, tetramethylphosphonium chloride, tetrakis(hydroxymethyl)phosphonium chloride, trihexyl(octyl)phosphonium chloride, trihexyltetradecylphosphonium chloride, octyl(tributyl)phosphonium chloride, triethyl(octyl) phosphonium chloride, trihexyltetradecylphosphonium bromide, tributyl(ethyl)phosphonium bromide, and other salts. Many of these phosphonium salts has wide applications as ionic liquids.

Monomphosphonium-counter acid combination may also be made by mixing phosphonium hydroxide with one or mixture of different counter acids. The counter acids can be monomeric (containing one functional acid group) or polymeric (containing 2 or more counter acid groups). Examples of suitable counter acids include sulfuric acid, sulfonic acid, p-toluene sulfonic acid, polystyrene sulfonic acid, polystyrene sulfonic acid copolymers, phosphoric acid, phosphonic acid, phytic acid, polyphosphonic acids, aliphthalic or aromatic acids containing one or more carboxylic acid groups, such as: formic acid, acetic acid, oxalic acid, malonic acid, succinic acid, glutaric acid, adipic acid, sebacic acid, 2,2-bis(hydroxymethyl)propionic acid, tartaric acid, citric acid, tricarballylic acid, polyacrylic acid, benzoic acid, phthalic acid, trimesic acid, etc.

Our previous study suggested that monoamine salt could improve coverage when used as an additive in slurry. Phosphonium salts may also be used as an additive in conductive polymer slurry for performance improvement. Certain phosphonium compounds such as tetrabutylphosphonium hydroxide can also be used to adjust pH of slurry, without causing agglomeration in slurry. This is a unique advantage over polyvalent crosslinkers reported in prior arts.

In addition to monophosphonium-counter acid combination, other combinations such as monosulfonium-counter acid may behave in similar way for conductive polymer coverage enhancement. The monophosphonium or monosulfonium functional group and counter acid can be present in the same molecular structure as in the case of S-Methylmethionine. The monophosphonium or monosulfonium-counter acid combination is preferred to be applied alone to fully realize its advantage. However, it can also be applied in conjunction with other type of coverage enhancing agents such as monoammonium or compounds containing more than one cationic functional groups.

Preparation of Monophosphnium-Acid Coverage Enhancing Agent Solutions

Solution 1

To 3.11 g of phosphoric acid 85% was added 84.16 g of DI water and 12.73 g of t-butylammonium hydroxide (TBAm) 55% solution in water. The pH of the solution was 5.3.

Solution 2

To 5.94 g of phytic acid 50% was added 81.33 g of DI water and 12.73 g of t-butylammonium hydroxide (TBAm) 55% solution in water. The pH of the solution was 5.3.

Solution 3

To 15.68 g of t-butylammonium sulfate 50% solution was added 85.32 g of DI water. The pH of the solution was 1.3.

Solution 4

To 3.11 g of phosphoric acid 85% was added 78.25 g of DI water and 18.64 g of t-butylphosphonium hydroxide (TBPh) 40% solution in water. The pH of the solution was 5.1.

Solution 5

To 5.94 g of phytic acid 50% was added 75.94 g of DI water and 18.64 g of t-butylphosphonium hydroxide (TBPh) 40% solution in water. The pH of the solution was 5.3.

Solution 6

To 6.16 g of p-toluene sulfonic acid was added 72.59 g of DI water and 21.25 g of t-butylphosphonium hydroxide (TBPh) 40% solution in water. The pH of the solution was 2.5.

Solution 7

To 1.70 g of sulfuric acid was added 82.94 g of DI water and 16.36 g of t-butylammonium hydroxide (TBAm) 55% solution in water. The pH of the solution was 2.7.

Solution 8

To 1.60 g of sulfuric acid was added 75.90 g of DI water and 22.50 g of t-butylphosphonium hydroxide (TBPh) 40% solution in water. The pH of the solution was 2.6.

Comparative Example 1

A series of tantalum anodes (100 microfarads, 35V) were prepared. The tantalum was anodized to form a dielectric on the tantalum anode. The anodized anode thus formed was dipped into a solution of iron (III) toluenesulfonate oxidant for 5 minute and sequentially dipped into ethyldioxythiophene monomer. The anodes were washed to remove excess monomer and by-products of the reactions after the completion of polymerization, which formed a thin layer of conductive polymer (PEDOT) on the dielectric of the anodized anodes. This process was repeated multiple times until a sufficient thickness of conductive polymer was achieved. A foreign doped polythiophene conductive polymer dispersion was applied to form an external polymer layer. After drying, alternating layers of monoamine-counter acid combination Solution 1 and the foreign doped polythiophene conductive polymer dispersion were applied and repeated 4-5 times, followed by washing in water, sequential coating of a graphite layer and a silver layer to produce a solid electrolytic capacitor. Parts were assembled, packaged and surface mounted. ESR was measured before and after surface mount.

Comparative Example 2

A series of tantalum anodes (100 microfarads, 35V) were prepared in the same way as Comparative Example 1 except that Solution 2 was used instead of Solution 1.

Comparative Example 3

A series of tantalum anodes (100 microfarads, 35V) were prepared in the same way as Comparative Example 1 except that Solution 3 was used instead of Solution 1.

Inventive Example 1

A series of tantalum anodes (100 microfarads, 35V) were prepared in the same way as Comparative Example 1 except that Solution 4 was used instead of Solution 1.

Inventive Example 2

A series of tantalum anodes (100 microfarads, 35V) were prepared in the same way as Comparative Example 1 except that Solution 5 was used instead of Solution 1.

Inventive Example 3

A series of tantalum anodes (100 microfarads, 35V) were prepared in the same way as Comparative Example 1 except that Solution 6 was used instead Solution 1.

Comparative Example 4

A series of tantalum anodes (100 microfarads, 35V) were prepared. The tantalum was anodized to form a dielectric on the tantalum anode. The anode thus formed was dipped into a solution of iron (III) toluenesulfonate oxidant for 5 minute and sequentially dipped into ethyldioxythiophene monomer. The anodes were washed to remove excess monomer and by-products of the reactions after the completion of polymerization, thereby forming a thin layer of conductive polymer (PEDOT) on the dielectric of the anodes. This process was repeated multiple times until a sufficient thickness of conductive polymer was achieved. Solution 7 was applied and dried. Following this step, A foreign doped polythiophene conductive polymer dispersion was applied and dried to form an external polymer layer. This was repeated 4 times, followed by sequential coating of a graphite layer and a silver layer to produce a solid electrolytic capacitor. Parts were assembled, packaged and surface mounted. ESR was measured before and after surface mount.

Inventive Example 4

A series of tantalum anodes (100 microfarads, 35V) were prepared in the same way as Comparative Example 4 except that Solution 5 was used instead of Solution 7.

Inventive Example 5

A series of tantalum anodes (100 microfarads, 35V) were prepared in the same way as Comparative Example 4 except that Solution 8 was used instead of Solution 7.

Inventive Example 6

A series of tantalum anodes (100 microfarads, 35V) were prepared in the same way as Comparative Example 4 except that Solution 6 was used instead of Solution 7.

The finished capacitors were subjected to power cycling test. Power Cycling Test (surge voltage) was done at ambient 85 C, with rated voltage on for 5 seconds, followed by turning off the voltage for 1 second. The voltage on/off cycle was repeated for 50,000 times. Capacitance of the parts were tested before and after the power cycling cycles and the % capacitance change is calculated.

As seen in Table 1, t-butylphosphonium-counter acid combinations are found to greatly improve corner and edge coverage of external polymer dispersion (or slurry) when it is applied between slurry dipping cycle. Complete corner/edge is obtained after 5 slurry dipping cycle. Similar coverage improvement is seen when t-butylphosphonium-counter acid combinations are applied before the 1st external conductive slurry dipping cycle (Table 2). The comparative examples using t-butylammonium-counter acid combinations all show inferior coverage, which is reflected as more shorted parts. We also noted lower power cycling capacitance loss with t-butylphosphonium-counter acid combinations. This may be related to phosphonium-counter acid's capability to interact with PEDOT (Ref. Journal of the American Chemical Society 135(30), 2013, 11309-11313). Other potential benefits by using phosphonium vs. ammonium coverage enhancing agent include better thermal stability.

TABLE 1

| Examples | 5$^{th}$ Slurry Coverage | Encapsulated Parts Shorts % | Power Cycling Cap Change % |
|---|---|---|---|
| Comp. Ex 1 | 4 Corners exposed | 8.7% | −13% |
| Comp. Ex 2 | 3-4 Corners exposed | 4.3% | −11% |
| Comp. Ex 3 | 4 Corners and top edge exposed | 20.7% | −16% |
| Invent. Ex 1 | Complete | 1.1% | −6% |
| Invent. Ex 2 | Complete | 1.1% | −4% |
| Invent. Ex 3 | Complete | 0% | na |

TABLE 2

| Examples | 5$^{th}$ Slurry Coverage | Encapsulated Parts Shorts % |
|---|---|---|
| Comp. EX 4 | Top Edge exposed | 10.9% |
| Invent. EX 4 | Complete | 0.0% |
| Invent. EX 5 | Complete | 4.3% |
| Invent. EX 6 | Complete | 0.0% |

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A method for forming a solid electrolytic capacitor comprising:
   providing an anode with an anode lead extending therefrom;
   forming a dielectric on said anode thereby forming an anodized anode; and
   forming a cathode layer over said dielectric by:
   applying a conductive polymer solution or dispersion; and
   applying a primer solution or dispersion comprising a monophosphonium or monosulfonium cation.

2. The method for forming a solid electrolytic capacitor of claim 1 wherein said conductive polymer solution or dispersion and said primer solution or dispersion are combined prior to said applying said conductive solution or dispersion.

3. The method for forming a solid electrolytic capacitor of claim 1 wherein said primer solution comprises a counter acid.

4. The method for forming a solid electrolytic capacitor of claim 3 wherein said counter acid is selected from the group consisting of phosphoric acid, phytic acid, sulfuric acid, toluene sulfonic acid, polystyrene sulfonic acid, polystyrene sulfonic acid copolymer.

5. The method for forming a solid electrolytic capacitor of claim 4 wherein said counter acid is a weak acid with pKa larger than 2.5.

6. The method for forming a solid electrolytic capacitor of claim 4 wherein said monophosphonium cation is alkyl phosphonium.

7. The method for forming a solid electrolytic capacitor of claim 1 wherein said primer solution has a pH of 1-10.

8. The method for forming a solid electrolytic capacitor of claim 1 wherein said primer solution has a pH of 2-7.

9. The method for forming a solid electrolytic capacitor of claim 1 wherein said conductive polymer solution or dispersion is applied before said primer solution.

10. The method for forming a solid electrolytic capacitor of claim 1 wherein said primer solution is applied before said conductive polymer solution or dispersion.

11. The method for forming a solid electrolytic capacitor of claim 1 wherein said conductive polymer solution or dispersion comprises crosslinking compounds.

12. The method for forming a solid electrolytic capacitor of claim 11 wherein said crosslinking compounds contains epoxy functionalities.

13. The method for forming a solid electrolytic capacitor of claim 1 wherein said conductive polymer comprises a polyanion.

14. The method for forming a solid electrolytic capacitor of claim 13 wherein said polyanion is polystyrene sulfonic acid homopolymer or copolymer.

15. The method for forming a solid electrolytic capacitor of claim 1 wherein said conductive polymer comprises a polyanion and the polyanion/monomer weight ratio is less than 3.

16. The method for forming a solid electrolytic capacitor of claim 1 wherein said primer solution further comprises a monoammonium cation.

17. The method for forming a solid electrolytic capacitor of claim 1 wherein said primer solution
   further comprises a compound comprising more than one cationic functional groups.

18. The method for forming a solid electrolytic capacitor of claim 1 wherein said primer solution has a weight concentration of no greater than 20%.

19. The method for forming a solid electrolytic capacitor of claim 1 wherein said primer solution comprises hydroxide as a counter ion.

20. The method for forming a solid electrolytic capacitor of claim 1 further comprises a washing step in water or other solvents.

21. The method for forming a solid electrolytic capacitor of claim 1 further comprises a process step under humidity greater than RH 50%.

22. A method for forming a solid electrolytic capacitor comprising:
    providing an anode with an anode lead extending therefrom;
    forming a dielectric on said anode thereby forming an anodized anode; and
    forming a cathode layer over said dielectric by:
        applying a conductive polymer solution or dispersion; and
        applying a primer solution or dispersion comprising a phosphonium or sulfonium cation and a counter anion.

23. The method for forming a solid electrolytic capacitor of claim 22 wherein said conductive polymer solution or dispersion and said primer solution or dispersion are combined prior to said applying said conductive solution or dispersion.

24. A method for forming a solid electrolytic capacitor comprising:
    providing an anode with an anode lead extending therefrom;
    forming a dielectric on said anode thereby forming an anodized anode; and
    forming a cathode layer over said dielectric by:
        applying a conductive polymer solution or dispersion; and
        applying a primer solution or dispersion comprising a phosphonium or sulfonium cation and a weak acid anion, wherein said weak acid has a pKa larger than 2.5.

25. The method for forming a solid electrolytic capacitor of claim 24 wherein said conductive polymer solution or dispersion and said primer solution or dispersion are combined prior to said applying said conductive solution or dispersion.

26. A solid electrolytic capacitor comprising:
    an anode with an anode lead extending therefrom;
    a dielectric on said anode thereby forming an anodized anode; and
    a cathode layer over said dielectric wherein said cathode comprises a conductive polymer and a monophosphonium or monosulfonium cation.

27. The solid electrolytic capacitor of claim 26 wherein said cathode further comprises a counter acid.

28. The solid electrolytic capacitor of claim 27 wherein said counter acid is selected from the group consisting of phosphoric acid, phytic acid, sulfuric acid, toluene sulfonic acid, polystyrene sulfonic acid, polystyrene sulfonic acid copolymer.

29. The solid electrolytic capacitor of claim 28 wherein said counter acid is a weak acid with pKa larger than 2.5.

30. The solid electrolytic capacitor of claim 28 wherein said monophosphonium cation is alkyl phosphonium.

31. The solid electrolytic capacitor of claim 26 wherein said cathode comprises crosslinking compounds.

32. The solid electrolytic capacitor of claim 31 wherein said crosslinking compounds contains epoxy functionalities.

33. The solid electrolytic capacitor of claim 26 wherein said conductive polymer comprises a polyanion.

34. The solid electrolytic capacitor of claim 33 wherein said polyanion is polystyrene sulfonic acid homopolymer or copolymer.

35. The solid electrolytic capacitor of claim 26 wherein said conductive polymer comprises a polyanion and the polyanion/monomer weight ratio is less than 3.

36. The solid electrolytic capacitor of claim 26 wherein said primer solution further comprises a monoammonium cation.

37. The solid electrolytic capacitor of claim 26 wherein said cathode further comprises a compound comprising more than one cationic functional groups.

38. The solid electrolytic capacitor of claim 26 wherein said cathode comprises hydroxide as counter ion.

* * * * *

UNITED STATES PATENT AND TRADEMARK OFFICE
CERTIFICATE OF CORRECTION

PATENT NO. : 12,205,775 B2
APPLICATION NO. : 17/708196
DATED : January 21, 2025
INVENTOR(S) : Yaru Shi, Antony Chacko and Ajaykumar Bunha Page 1 of 1

It is certified that error appears in the above-identified patent and that said Letters Patent is hereby corrected as shown below:

In the Specification

Column 2, Line 24 change "is dried" to "is tried"

Column 4, Line 10 change "dispersion is" to "dispersion in"

Signed and Sealed this
Twenty-seventh Day of May, 2025

Coke Morgan Stewart
*Acting Director of the United States Patent and Trademark Office*